US012637307B2

(12) United States Patent
Dekocker et al.

(10) Patent No.: US 12,637,307 B2
(45) Date of Patent: May 26, 2026

(54) SYSTEM FOR TREATING AND PROCESSING A PRIMARY PACKAGING CONTAINER

(71) Applicant: Anheuser-Busch InBev S.A., Brussels (BE)

(72) Inventors: Wim Dekocker, Leuven (BE); Marcelo Petramale, Leuven (BE); Glenn Ferreira, Leuven (BE); Philippe Jean Marie Duperray, Châteauroux (FR)

(73) Assignee: ANHEUSER-BUSCH INBEV S.A., Brussels (BE)

( * ) Notice: Subject to any disclaimer, the term of this patent is extended or adjusted under 35 U.S.C. 154(b) by 224 days.

(21) Appl. No.: 18/250,720

(22) PCT Filed: Oct. 26, 2021

(86) PCT No.: PCT/EP2021/079735
§ 371 (c)(1),
(2) Date: Apr. 26, 2023

(87) PCT Pub. No.: WO2022/090266
PCT Pub. Date: May 5, 2022

(65) Prior Publication Data
US 2023/0382661 A1 Nov. 30, 2023

(30) Foreign Application Priority Data
Oct. 27, 2020 (BE) .................................... 2020/5756

(51) Int. Cl.
B65G 54/02 (2006.01)
(52) U.S. Cl.
CPC ................................... B65G 54/02 (2013.01)

(58) Field of Classification Search
None
See application file for complete search history.

(56) References Cited

U.S. PATENT DOCUMENTS 6,868,652 B2 3/2005 Arends et al.
7,134,258 B2 11/2006 Kalany et al.
(Continued)

FOREIGN PATENT DOCUMENTS

CN 107303720 A 10/2017
DE 102010020958 A1 11/2011
(Continued)

OTHER PUBLICATIONS

International Search Report and Written Opinion for Application No. PCT/EP2021/079735 dated Feb. 16, 2022 (14 pages).
(Continued)

*Primary Examiner* — Tanzim Imam
(74) *Attorney, Agent, or Firm* — ArentFox Schiff LLP

(57) ABSTRACT

The present invention provides a system for treating primary container packaging comprising •—a main transportation unit (102) configured to transport a number of gripping units (108) mounted on independently motion controlled movers (106), each gripping unit (108) adapted for transporting an individual primary container, •—an adjacent transportation unit (104) configured to transport a number of tools (114) mounted on independently motion controlled movers (112), said tools configured to provide one or more primary container material components to the main transportation unit and/or performing packaging process operations to the primary containers present at said main transportation unit.

14 Claims, 4 Drawing Sheets

(56) References Cited

U.S. PATENT DOCUMENTS

| | | | |
|---|---|---|---|
| 8,903,540 | B2 | 12/2014 | Stork et al. |
| 9,233,800 | B2 | 1/2016 | Senn et al. |
| 9,604,792 | B2 | 3/2017 | Wipf |
| 10,150,219 | B2 | 12/2018 | Ridel et al. |
| 11,001,400 | B2 | 5/2021 | Kalany et al. |
| 2016/0207658 | A1 | 7/2016 | Bellante |
| 2017/0343483 | A1 | 11/2017 | Piana et al. |
| 2018/0072445 | A1 | 3/2018 | Burkhard et al. |
| 2020/0317384 | A1* | 10/2020 | Giuliani .................... B65C 9/02 |
| 2021/0229847 | A1 | 7/2021 | Kalany et al. |

FOREIGN PATENT DOCUMENTS

| | | | |
|---|---|---|---|
| DE | 102011016855 | A1 | 10/2012 |
| DE | 102011083377 | A1 | 3/2013 |
| DE | 102011086708 | A1 | 5/2013 |
| DE | 202013105022 | U1 | 2/2014 |
| DE | 102013111088 | A1 | 4/2015 |
| DE | 102016211169 | A1 | 12/2017 |
| DE | 202018103487 | U1 | 8/2018 |
| DE | 102017223078 | A1 | 6/2019 |
| DE | 102019112837 | A1 | 11/2020 |
| EP | 0619267 | A1 | 10/1994 |
| EP | 1803665 | B1 | 5/2009 |
| EP | 2338795 | B1 | 10/2012 |
| EP | 3466845 | A1 | 4/2019 |
| EP | 3317186 | B1 | 7/2019 |
| EP | 3597549 | A1 | 1/2020 |
| EP | 3718913 | A1 | 10/2020 |
| EP | 3778439 | A1 | 2/2021 |
| IT | BO20000327 | A1 | 12/2001 |
| WO | WO-9852853 | A2 * | 11/1996 .......... B65B 21/242 |
| WO | 9852825 | A1 | 11/1998 |
| WO | 2015/036196 | A2 | 3/2015 |
| WO | 2015101862 | A1 | 7/2015 |
| WO | 2015121668 | A1 | 12/2016 |
| WO | 2019007923 | A1 | 1/2019 |
| WO | 2018144552 | A1 | 12/2019 |
| WO | 2020243814 | A1 | 12/2020 |
| WO | 2020244951 | A1 | 12/2020 |
| WO | 2021019007 | A1 | 2/2021 |
| WO | 2021245235 | A2 | 12/2021 |

OTHER PUBLICATIONS

Beckhoff Automation Deutschland: "Xplanar: Neue Freiheitsgrade nutzen", Youtube, Feb. 10, 2020 (Feb. 10, 2020, p. 1 pp. Retrieved from the Internet: URL:https://www.youtube.com/watch?v=IYw8fy9VQ24&t=75s (3 pages with translation of video description).

Belgian Search Report and Written Opinion for Application No. 202005756 dated Jul. 8, 2021 (15 pages).

* cited by examiner

SYSTEM FOR TREATING AND PROCESSING A PRIMARY PACKAGING CONTAINER

CROSS REFERENCE TO RELATED APPLICATIONS

This application is a national stage filing under 35 U.S.C. § 371 of International Patent Application No.: PCT/EP2021/079735, filed Oct. 26, 2021, which claims priority to Belgium Patent Application No. BE2020/5756, filed Oct. 27, 2020, the entire contents of each of which are incorporated by reference herein.

FIELD OF INVENTION

The present invention generally relates to transportation units and systems for treating and processing a package. More particularly, the present invention relates to transportation units and systems for treating and performing one or more processes on a primary packaging container and to a machine using such units and systems.

BACKGROUND OF INVENTION

For handling, treating, loading/unloading and processing functions e.g. filling, rinsing, capping, decorating, treating, measuring and/or inspecting a primary packaging container, many processing methods, machines and systems have been devised for and in industry. Such processing systems generally include one or more transportation units equipped with conventional means to handle the primary packaging containers, and thereby move the primary packaging containers from one place to another, or one machine to another, or one conveyor to another conveyor.

Typical architectures of such transportation units in a conventional processing system includes the use of timing scrolls, star wheels and guides for primary container handling into and between primary packaging operations. Various executions of scroll, star wheel and guide primary container handling are implemented in different packaging machines, such as container cleaning or rinsing equipment, liquid filling and capping, labelling and inspection machines. Star wheel and guide architectures in processing systems are usually bulky and have complex drive (power transmission) arrangements. Thus, the star wheel and guide architectures may be problematic for personnel to access various parts or components of the processing machines, occupy more space and do not allow ease in retrieval or changing of parts, due to its bulkiness and complex structure, especially for high capacity systems. In addition, line pressure queuing, entry into and handling by scrolls (worms) and star wheels and guides often results in high impact events, shocks and light through heavy loading of container to container and/or container to container handling part contact which limits attempts to reduce the wall thickness and hence the light weighting of containers.

Many other processing systems with processing units are generally implemented for executing processing functions like handling, treating, loading/unloading and other functions e.g. filling, rinsing, capping on a primary packaging container. But nearly all the presently available processing systems for packaging containers lack in one or more features, for example, due to bulkiness or complex structures, systems lack ability in changing parts or components of the processing machines, and thus such changeovers take time, resulting in lost production time and impacting productivity. Also, the current processing systems are not adaptable depending on the type of the primary packaging container being treated.

The current technologies or solutions also lack in providing tools for individual primary packaging container processing. Further, the current systems do not provide a solution for performing functions, such as packaging operations, treatment/processing functions on the primary packaging containers from any or all sides of the primary packaging containers.

Therefore, it is a first objective of the present invention to provide motion-controlled packaging and treating operations that are implemented on moveable units being able to be transferred to the primary containers while in independent, motion controlled transit.

It is an objective of the present invention to provide packaging and treatment machines for treating individual primary containers. A consequence of individual treatments is further also that container to container contact during transfer and/or processing may be reduced, that use of scroll (worm) and star wheel and guide configurations are avoided, if not eliminated, and therefore that container damage and or spoilage associated with impact events, pressure shocks, high forces and shear (surfaces rubbing) are significantly reduced or eliminated.

It is also an objective of the present invention to provide primary packaging material components to individual primary containers in assembly, and also while being in transit.

It is an objective of the present invention to realize "synchronized", motion-controlled packaging operations that are operating about the base, sides, corners and top of the individual primary containers while the individual primary containers are conveyed in pitch optimized transit (variable pitch and speed) through a packaging system, while in addition including consideration of integrated tooling within the independently controlled package transportation movers (carts) or tiles being transported along the main, pace setting, master transportation system.

It is also an objective of the present invention to realize programmable, dynamic, packaging processes that cover exceptionally wide ranges of package type, size and shape as well as process, component and assembly sequences.

It is also an objective of the present invention to realize synchronized, highly flexible, large range, custom packaging operations at capacity, while in transit.

It is also an objective of the present invention to provide a recipe driven and/or dynamic packaging system that can implement one or more packaging components and packaging and/or treatment operations depending on the type of products to be packaged or operated upon.

It is further an objective of the present invention to provide an overall packaging machine which is compact, adaptive, coupled with digitalized solutions, and eliminates the need for package specific change parts and/or assemblies.

A further objective of the invention includes strong support of tooling adaptability and optimizable, software driven flexibility in the overall packaging machine.

It is also an objective of the present invention to achieve nimble flexibility at capacity for an efficient assembly of an exceptionally wide range of products and package types, shapes, formats and assembly sequences via synchronized, adaptive packaging processes in pitch optimized, motion-controlled transit.

Another objective of the present invention includes realization of adaptive packaging and treatment processes in transit, where the optimizable packaging processing is arranged in one or more variable, multi-module, dynamic, sequential, production processes along one or more routes of one or more conventional and/or independent, motion controlled main package transportation systems and along which a primary product is loaded/unloaded or presented opposite with and via which the individual primary packages are assembled. This further giving rise to the elimination of an extraordinary degree of package design, format and operational constraints, while conversely enabling operational range, capacity, performance and productivity benefits.

Another objective of the present invention includes a modular and programmable execution of the packaging machine with wide dimensional adjustment range (position, height and width of linear drives), and capability for package family tooling, and flexibility in operational sequences and possible dexterities of those tooling.

Additional objective of the invention is to provide a non-conventional, non-traditional machine that is void of the restricted packaging or treatment design options and limited formats offered by conventional, commercially available solutions.

SUMMARY OF THE INVENTION

In an aspect of the present invention, a system for treating primary container packaging is adapted for transporting a number of container holding devices, mounted on independently motion controlled movers at a main transportation unit, to an adjacent transportation unit that is transporting a number of tools mounted on independently motion controlled movers, where each container holding device is adapted for transporting an individual primary container, and the said tools are adapted to provide one or more primary container material components to the main transportation unit and/or perform packaging process operations to the primary containers present at the main transportation unit.

The disclosure provides a system for treating primary container packaging comprising a main transportation unit configured to transport a number of container holding devices mounted on independently motion controlled movers, each container holding device adapted for transporting an individual primary container, an adjacent transportation unit configured to transport a number of tools mounted on independently motion controlled movers, said tools configured to provide one or more primary container material components to the main transportation unit and/or performing packaging process operations to the primary containers present at said main transportation unit.

In an aspect of the present invention, the tools provide one or more primary container material components to the main transportation unit and/or perform packaging process operations to the primary containers present at the main transportation unit, while the primary containers are in transit.

In an aspect of the present invention, the main transportation unit and/or the adjacent transportation unit is a closed loop transportation unit.

In an aspect of the present invention, the adjacent transportation unit is 3-dimensionally moveable relative to the main transportation unit. Specifically, the adjacent transportation unit is 3-dimensionally moveable along and/or about its X, Y, Z axes [i.e. optionally able to incline, or to tilt, or to rotate around one or more of the X, Y, Z axes (often referred to as pitch, yaw, and roll) and all combinations or rotation and translation thereof.

In an aspect of the present invention, the container holding devices and/or the tools may be wirelessly controlled and/or wireless powered and/or position sensed.

An aspect of the present invention provides a system as described above and further includes a control system enabling synchronization of the pace and pitch of the tools with the pace and pitch of the container holding devices on the main transportation unit.

In an aspect of the present invention, the control system enables control of the 3-dimensional movement of the adjacent transportation unit relative to the primary containers.

In an aspect of the present invention, the system as described above has a plurality of adjacent transportation units and the control system further enables the control of the 3-dimensional movement of the adjacent transportation units for simultaneously providing one or more primary container material components to a primary container in assembly and/or simultaneously providing packaging process operations to the packaging in assembly, eg. for labelling and inspecting.

Another aspect of the present invention provides a mover of the adjacent transportation unit supports only one tool, or supports several tools optionally adapted differently for performing different operations dependent on the operations required, or one tool may be supported by several movers, for example, individual movement of movers relative to each other and supporting one tool may result in that tool being moved, for example articulated, rotated, translated, lifted, lowered or retracted.

An aspect of the present invention provides a system as described above where the tools are adapted for translating, positioning, off-setting, inclining, rotating, orienting, spinning, vibrating, shaking or osscilating etc. the primary containers, while in transit, or any combination thereof.

As examples, the aforementioned articulations being could be used for container orientation sensing, orienting, labelling, coding, printing, inspecting, weighing, surface treating, heating, cooling, rinsing, cleaning, filling, capping, vibrating, illuminating or measuring the primary containers, while in transit, or any combination thereof.

A yet another aspect of the present invention provides the main transportation unit is a closed loop track and the container holding devices comprise a container gripping unit, eg. a gripper, clamp(s), any type of means for gripping/clamping a container body, neck, cap, lid, cork, crown, or rim, a pneumatic or electric tulip, or a base pallet.

In an embodiment, the main transportation unit comprises parallel top and bottom closed loop tracks and the primary containers are clamped between container holding devices on the respective top and bottom closed loop tracks.

In an embodiment, the independently motion controlled movers of the main transportation unit are mounded and moving on a rail or track (i.e. a linear motor or any other type of rail based or track based propelling system). Alternatively, the main transportation unit is a magnetic driving surface and its independent motion controlled movers are levitating tiles.

In an embodiment, at least one of the adjacent transportation units comprises a magnetic driving surface and its independent motion controlled movers (i.e. tool movers) are levitating tiles.

In a further embodiment in accordance with the present invention, both the main transportation unit and the one or more adjacent transportation units comprise a magnetic driving surface where the independent motion controlled movers (i.e. package movers) are levitating tiles.

An aspect of the present invention provides the container holding devices are adapted for moving the individual primary containers relative to the tooling (including translating, or inclining, or tilting, or rotating an individual primary container along and/or around one or more of the X, Y, Z axes, or any combination thereof).

In another embodiment, the controller control system further enables controlling the relative movement of the primary containers relative to the tooling.

An aspect of the present invention provides a system as described above and further includes a change-over station for loading and/or receiving and storing inactive tools and/or holding devices, and/or for adaptation or adjustment of tools and/or holding devices.

An aspect of the present invention provides a machine for treating a primary container and comprising a system as described above. Specifically, the machine may be suitable for inspecting, or rinsing, or filling, or capping, or decorating a primary container or any combination thereof. The primary containers may be at least partially filled or empty.

In an aspect of the present invention, the machine further includes a plurality of systems as described above and where the main transportation unit is a continuous transportation unit through the plurality of systems. Such continuous transportation unit may be magnetic driving surface as well. Further according to the disclosure is a machine comprising a plurality of adjacent transportation units and wherein the main transportation unit is a continuous transportation unit.

DETAILED DESCRIPTION

Figure 1:
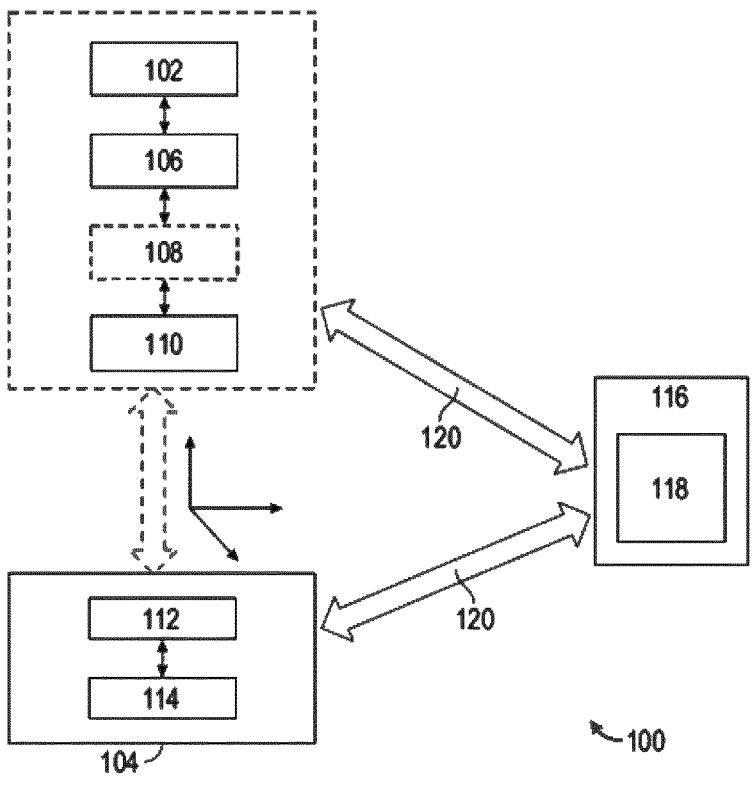
FIG. 1 illustrates an exemplary environment of a system including an adjacent transportation unit and a main transportation unit, in accordance with an embodiment of the present invention.

The present invention provides a system and a machine for treating an individual primary packaging container. The system and machine includes performing one or more operations, including treating, processing and/or packaging, on the primary packaging container. In an embodiment, the one or more operations are performed on the primary container, while being in transit.

In an embodiment, the system provides one or more packaging material components and providing packaging process operations to a given primary packaging container in assembly.

In an aspect of the present invention, the system comprises of at least one main transportation unit and at least an adjacent transportation unit. The main transportation unit has a plurality of independently motion controlled movers, which are further mounted or integrated with one or more container holding devices. Each container holding device is adapted to hold and/or manipulate an individual primary container while stationary or while being transported. Thus, the main transportation unit transports primary containers, using independently motion controlled movers.

The adjacent transportation unit transports a number of tools mounted on independent, motion controlled movers, and the tools perform one or more operations on the either full or empty primary containers which are at the main transportation unit. The one or more operations include and are not limited to packaging operations, treatment operations and processing operations such as cleaning, rinsing, filling, capping, labeling, measuring, gauging, inspecting, drying, decorating, illuminating, vibrating, weighing, heating, cooling and the like. In an embodiment, the tools perform one or more operations on an individual primary container.

It may be apparent to a person ordinary skilled in the art that the system may require different well-known processing or packaging operations to be performed on the primary packaging containers, and the system of the present invention is able to execute such well-known processing or packaging operations via the adjacent transportation unit equipped with tools, without deviating from the meaning and scope of the present invention.

In an embodiment, the tools provide one or more primary container material components to the main transportation unit and/or perform packaging process operations to the primary containers present at the main transportation unit.

The adjacent transportation unit is positioned relative to the main transportation unit so that the tools are able to perform one or more operations on the primary containers while in transit. Also, the main transportation unit and the adjacent transportation unit are able to move with respect to each other in on or more dimensions. Both the units may include a movement system, as for example rails or tracks or slides or linear motors or robotics, or overhead frames or overhead robots, stand-alone or integrated with the main transportation unit, or integrated in a processing system frame or processing machine frame.

In an embodiment, the main transportation unit and the adjacent transportation unit consist of systems of individual, motion controlled carts (linear drives) or systems of individual, motion controlled levitating tiles or any combination thereof.

In operation, the main transportation units drive the movers or levitating tiles, may be referred to as package movers, which in turn drive one or more container holding devices mounted on and/or integrated in each package mover. This transports the primary packaging containers held by the container holding devices in the assembly. Thus, the main transportation unit transports the primary packaging containers, such as primary containers, in the assembly. The adjacent transportation unit moves relative to the main transportation unit, where the adjacent transportation unit drives the movers and/or levitating tiles, may be referred to as tool movers, which in turn drive the one or more tools mounted on and/or integrated in each tool mover. Thus, the adjacent transportation unit moves the tools. These tools perform one or more required operations on the individual packaging container at the main transportation unit in the assembly.

In an embodiment, the main transportation unit transports or transfers the primary containers to the tools mounted on the adjacent transportation unit. In another embodiment, the adjacent transportation unit transports or transfers the tools to the primary containers, on the main transportation unit, for performing the operations on the primary containers. In another embodiment, both the main transportation unit and the adjacent transportation unit move relative each other while the tools perform the one or more operations at the primary containers in the assembly.

In an aspect of the invention, the adjacent transportation unit is 3-dimensionally moveable relative to the main transportation unit. In an embodiment, the adjacent transportation unit is able to translate, or incline, or to tilt, or to rotate along and/or around one or more of the X, Y, Z axes (often referred to as pitch, yaw, and roll) and all combinations thereof. Further, in an embodiment the adjacent transportation unit is moveable in multiple degrees of freedom with respect to the main transportation unit.

In an embodiment, the adjacent transportation unit is able to move along a vertical axis (Z), e.g. variability in height relative to the main transportation unit, along a horizontal axis (X), e.g. variability in position in a direction parallel to the main transportation unit machine direction, and along a second horizontal axis (Y), e.g. variability in position in a direction perpendicular to the main transportation unit machine direction.

In an embodiment, the adjacent transportation units are placed at various angles or positions with respect to the main transportation unit and are position settable with six degrees of freedom such that the adjacent transportation units are able to perform the operations, in three dimensions and in multiple degrees of freedom, at the individual primary containers onto the main transportation unit. Therefore, the system is able to achieve maximum degree of flexibility and dynamic in providing the packaging, treating and/or processing operations to the individual primary containers onto the main transportation unit.

In an embodiment of the present invention, the system may include multiple adjacent transportation units enveloping the main transportation unit from at least three sides (eg. left, right, overhead in machine direction or any combination at between orthogonal arrangements), inclined to the main transportation unit at any suitable angle (including 0°), situated at any suitable distance from main transportation unit and moving independently in three dimensions with respect to the main transportation unit, thereby covering movement about the main transportation unit in maximum degrees of freedom, giving the system enormous flexibility in performing operations on the individual primary containers on the main transportation unit, without deviating from the meaning and scope of the present invention.

In a further embodiment, the system may include at least three main transportation units enveloping the adjacent transportation unit from at least three sides (eg. left, right, overhead in machine direction or any combination at between orthogonal arrangements), inclined to the adjacent transportation unit at any suitable angle (including 0°), situated at any suitable distance from adjacent transportation unit and moving independently in three dimensions with respect to the adjacent transportation unit, thereby covering the adjacent transportation unit from all sides. In such scenario, the main transportation unit can transport packaging containers to the tools on the adjacent transportation unit from any side, in any orientation, as required, for example even in upside down orientation, or containers tilted at a certain angle being transported in X dimension related to the adjacent transportation unit. Thus, such aspects of the give the system enormous flexibility in performing operations on the individual primary containers on the main transportation unit, without deviating from the meaning and scope of the present invention.

Also, the system may include the main transportation unit comprising multiple driving tracks mounted with container holding devices transporting the packaging containers, and the main transportation unit may comprise top and bottom parallel to each other. The primary containers may be clamped between synchronized container holding devices mounted on the respective top and bottom transportation units. The top and bottom tracks may be closed loop tracks or levitating tiles, one facing opposite the other in any overall orientation.

FIG. 1 illustrates an exemplary environment of the system including an adjacent transportation unit positioned with respect to a main transportation unit, in accordance with an embodiment of the present invention. A system 100 comprises of at least one main transportation unit 102; at least one adjacent transportation unit 104 and at least one central computer or controlling unit 116, where at least one of the main transportation unit 102 and at least one of the adjacent transportation unit 104 are able to move with respect to each other.

The main transportation unit 102 has a plurality of independently motion controlled movers 106 (referred to as package movers 106); each package mover 106 is adapted to transport one or more packaging containers 110, particularly primary containers. Also, a plurality of package movers may also be adapted to act on one primary container.

In an embodiment, each package mover 106 may be mounted or otherwise integrated with one or more container holding devices 108, where each container holding device 108 is adapted for transporting an individual primary container 110.

The container holding devices 108 may comprise a container gripping unit, such as including and not limited to one or more grippers, clamps, pneumatic, vacuum or electric tulips, and the like to hold and manipulate the handling of the primary container 110.

In an embodiment, the container holding device 108 may include and is not limited to at least one gripper set that further comprising a pair of claws or fingers, of which at least one is powered for dynamically gripping a container. In an embodiment, at least one gripper set is adapted to manipulate the handling of an individual primary container 110, the handling operations including and not limited to translating, or inclining, or tilting, or rotating, or spinning an individual primary container along and/or around one or more of the X, Y, Z axes.

Further, the adjacent transportation unit 104 has a plurality of independently motion controlled rail or track mounted movers or levitating tiles 112 (referred to as tool movers 112); each tool mover 112 is mounted with one or more tools 114. The tools 114 perform one or more operations on the primary containers 110. The one or more operations include and are not limited to packaging operations, treatment operations, or processing operations.

The package movers 106, container holding devices 108 and the tool movers 112 and the tools 114 are automatically controlled, and are customizable, lightweight, strong, adjustable, and dynamically programmable. Further, the container holding devices 108 are dynamic and flexible in nature, and can be dynamically controlled using a software program, possibly with feedback a sensing mechanism integrated into the tools. Based on various shapes and sizes of the primary containers 110, the container holding devices 108 can flexibly and dynamically adapt its handling mechanism in order to handle the primary containers 110.

In an embodiment, the tools 114 on or integrated in the tool movers 112, provide one or more primary container material components to the primary products held by the tools 108 of the package movers 106, on the main transportation unit 102 and/or perform packaging operations to the primary products 110 present at the main transportation unit 102.

In an embodiment, the tools 114 on or integrated in the tool movers 112, provide one or more primary container material components to the primary products held by the tools 108 of the package movers 106, on the main transportation unit 102 and/or perform packaging operations to the primary products 110 present at the main transportation unit 102, while the primary containers 110 are in transit.

In an embodiment, the tool mover 112 supports only one tool 114, or supports several tools 114 optionally adapted differently for performing different operations dependent on the operations required. In another embodiment, one tool 114 may be supported by several tool movers 112. For example, individual movement of tool movers 112 relative to each other and supporting one tool 114 may results in that tool 114 being moved, for example, articulated, rotated, translated, inclined, extended or retracted.

The tools 114 are adapted for performing operations on the primary containers 110 such as including and not limited to orientation sensing, labeling, coding, printing, inspecting, heating, cooling, drying, illuminating, vibrating, weighing, scanning or measuring the primary containers 110 in transit, or any combination thereof.

The container holding devices 108 hold and move the primary containers 110 around and about the tools mounted on the tool movers 112 of the adjacent transportation unit 104 for the tools 114 to perform the operation on, around and about the primary containers 110. For example, the container holding devices 108 can move the primary containers 110 with in three dimensions and in multiple degrees of freedom about the tools mounted on the tool movers 112 of the adjacent transportation unit 104.

In an embodiment, each module of adjacent transportation unit 104 including the tool movers 112 and the tools 114 mounted on or integrated in 112 are position settable in three-dimensions operating opposite the main transportation unit 102. All the independent positioned and motion-controlled tool movers 112 are in controlled synchronized motion, are contactlessly powered and/or wirelessly controlled, and/or position sensed, enabling untethered, energized and controlled operation, synchronized operation in pitch and pace variable, independent motion controlled manner.

Also, each module of main transportation unit 102 including the package movers 106, the container holding devices 108 and the primary containers 110 are position settable in three-dimensions moving opposite the adjacent transportation unit 104. All the independent positioned and motion-controlled package movers 106 and/or container holding devices 108 are in controlled synchronized motion, are contactless powered and synchronized, while also being wirelessly (untethered) automation controlled.

In the system 100, both the main transportation unit 102 and the adjacent transportation unit 104 are able to move with respect to each other, for transporting primary containers 110 to the tools 114, or transporting tools to the primary containers 110, or even moving the primary containers 110 and the tools 114 with respect to each other, while the tools perform operations on the primary containers 110.

In an embodiment, the system 100 includes a plurality of adjacent transportation units 104 and a plurality of main transportation unit 102, and at least one of the adjacent transportation units 104 is 3-dimensionally moveable relative to at least one of the main transportation unit 102. In an additional embodiment, the adjacent transportation unit 104 is optionally be able to translate, or to incline, or to tilt, or to rotate along or around one or more of the X, Y, Z axes (often referred to as pitch, yaw, and roll) and all combinations thereof.

Additionally, the container holding devices 108 are adapted for moving the individual primary container 110 relative to the tool, such as including and not limited to translating, or inclining, or tilting, or rotating an individual primary container 110 along or around one or more of the X, Y, Z axes, or any combination thereof, according to an embodiment.

Further, the main transportation unit 102 drives the package movers 106 implementing a movement system, such as a linear drive motor, an independent motion controlled cart, a linear drive track or slides, rails, a flat or shaped surface of any orientation or geometry and the like. The adjacent transportation unit 104 drives the tool movers 112 implementing a movement system, such as a linear drive motor an independent motion controlled cart, a linear drive track or slides, rails, a flat or shaped surface of any orientation or geometry and the like.

Also in an embodiment, the main transportation unit 102 drives package movers 106 magnetically, where each package mover 106 is magnetically coupled with the main transportation unit 102 in a contactless manner. In this embodiment, the main transportation unit 102 is also inductively controlled and may have electrical coils, while the package mover 106 may be equipped with a permanent magnet for creating an electromagnetic field between the main transportation unit 102 and the package mover 106. Therefore, the package mover 106 moves freely, hovering over the main transportation unit 102 under the effect of electromagnetic forces generated due to the electromagnetic coil in the main transportation unit 102 and the permanent magnet in the package mover 106. The package mover 106 acts as levitating tiles, and further may be mounted or integrated with the container holding devices 108 to hold the primary containers 110 for transporting.

Under the same electromagnetic field principle, the adjacent transportation unit 104 can have electrical coils, the adjacent transportation unit 104 is a magnetic driving surface and the tool movers 112 are levitating tiles mounted with tools 114.

In an embodiment, the main transportation unit 102 and/or the adjacent transportation unit 104 may be implemented with inductive cables from which inductive power is transmitted via the package movers 106 and the tool movers 112 to the container holding devices 108 and the tools 114 respectively.

In an embodiment, at least one or all of the components of the system 100, including the main transportation unit 102 and/or the adjacent transportation unit 104 and their modules, such as the package movers 106, the container holding devices 108 and the tool movers 112 and the tools 114 are controlled by a central control system 116 or the controlling unit 116. The controlling unit 116 may be a local or a remote controlling device for controlling the operations of the system 100, and may be any computing device such as including and not limited to a desktop computer, a laptop, a smart phone, a mobile phone, an information pad, a tablet, a phablet, and the like. The controlling unit 116 may wired or wirelessly control the overall system 100 implementing a wired communication protocol or a wireless communication protocol respectively. A wired communication protocol may include and is not limited to cable connections, optical fiber cables, Ethernet, LAN, and the like. A wireless communication protocol may include and is not limited to short range wireless, such as Bluetooth, Infrared, Microwave, Narrow through Broad Band Telecommunications or WLAN, WAN, or Internet protocols and the like.

In an embodiment for wireless operation control of the components of the system 100, the components may be equipped with an antenna for wireless communication via wireless communication links such as WLAN or WAN etc. In such embodiments, the adjacent transportation unit 104, the tool mover 112 and the tool 114 may form a dedicated wireless network within which the tool mover 112 and the tool 114 and the adjacent transportation unit 104 may be wirelessly controlled via a data transmission cable following the closed loop or virtual closed loop or routing options of the levitating tiles. Further, in an embodiment, the tool 114 may be independently wirelessly controlled within their own dedicated wireless network.

In a similar manner, the package mover 106 and the container holding device 108 may form a dedicated wireless network within which the package mover 106 and the container holding device 108 and the main transportation unit 102 may be wirelessly controlled via a data transmission cable following the closed loop or virtual closed loop or routing options of the levitating tiles. Further, in an embodiment, the package mover 106 may be independently wirelessly controlled within their own dedicated wireless network.

The components of the system 100 communicate bi-directionally with the controlling unit 116 via the communication channel 120, for example a communication fieldbus 120. The controlling unit 116 is installed with a software application 118 that monitors, controls and optimizes operations of the overall system 100, including the main transportation unit 102, the adjacent transportation unit 104 and their modules, such as the package movers 106, the container holding devices 108, the primary container 110, the tool movers 112 and the tools 114.

The software application 118 may analyze the positioning measurements of the modules of the main transportation unit 102 and the adjacent transportation unit 104 and provide optimized paths, or positioning, or track management functions for the overall system 100 to the controlling unit 116, to further monitor and control the position and movements of components of the system 100. The controlling unit 116 also enables synchronization of the pace and pitch of the tools 114 with the pace and pitch of the container holding devices 108 for the transportation of the primary packaging on the main transportation unit 102. The controlling unit 116 system further enables controlling the relative movement of the primary containers 110 relative to the tools 114.

Further, the software application 118, in communication with one or more sensors, may also detect a current position and arrangement of the handling mechanism of the container holding devices 108 to hold the primary container 110, and may signal the container holding devices 108 to adapt or change the current position and arrangement of the handling mechanism according to the size, shape and design of the primary container 110.

In an embodiment, the controlling unit 116 controls the 3-dimensional movement of the adjacent transportation unit 104 relative to the primary containers 110. Additionally, the controlling unit 116 may also control the 3-dimensional movement of container holding devices 108 relative to the main transportation unit 102, or relative to a primary container treatment station, for the container holding devices 108 to manipulate handling of the primary container 110 on the main transportation unit 102.

In an embodiment, the controlling unit 116 further enables the control of the 3-dimensional movement of the adjacent transportation units 104 for simultaneously providing one or more primary container material components to a given primary container 110 in assembly and/or simultaneously providing packaging process operations to the given packaging 110 in assembly.

The system 100 may also include at least one of the main transportation unit 102 and at least one of the adjacent transportation unit 104 being a closed loop, including virtual closed loop, unit.

Further, the system 100 may also include a change-over station for loading and/or receiving and storing inactive tools 114 and/or for adaptation of tools 114.

The system 100 as described is able to transport the individual primary containers 110, either being levitated on the package movers 106 and the container holding devices 108 or driven on independent motion controlled movers on linear closed loop tracks, to and through the plurality of adjacent transportation units 104, where the adjacent transportation units 104 may further include one or more machines performing packaging, treatment or processing operations on the primary containers 110. The one or more machines may be for example like a container erector, a cleaner, a sterilizer, a rinser, a filler, a capper, a decorator, a labeling machine and/or an inspection machine, and the like.

The system 100 comprises multiple tools 114 which are programmable, robotic, custom tools and are mounted on or integrated into tool movers 112 of adjacent transportation unit 104. The adjacent transportation unit 104 may be position adjustable linear drives. The main transportation unit 102 may also be position adjustable linear drives. The adjacent transportation unit 104 may be configured and optimally controlled to operate on the individual primary containers 110 while following the motion profile of the main transportation unit 102 and hence travelling with the package 110 being operated on at the main transportation unit 102.

In an embodiment, the system 100 is a machine that comprises plurality of systems 100 and the one or more main transportation units 102 provide a programmable and variable, as may be executed via switches between linear transportation systems and/or re-routing of levitating tile paths, for continuous, pitch and pace setting transportation through the plurality of systems 100.

In an embodiment, all the software-controlled components in the system 100 may be re-programmed and exchanged or upgraded to suit a broad range (family) of packages 110 being operated on, thus ensuring the system 100 remains relevant and suitable for optimized performance.

Figure 2:
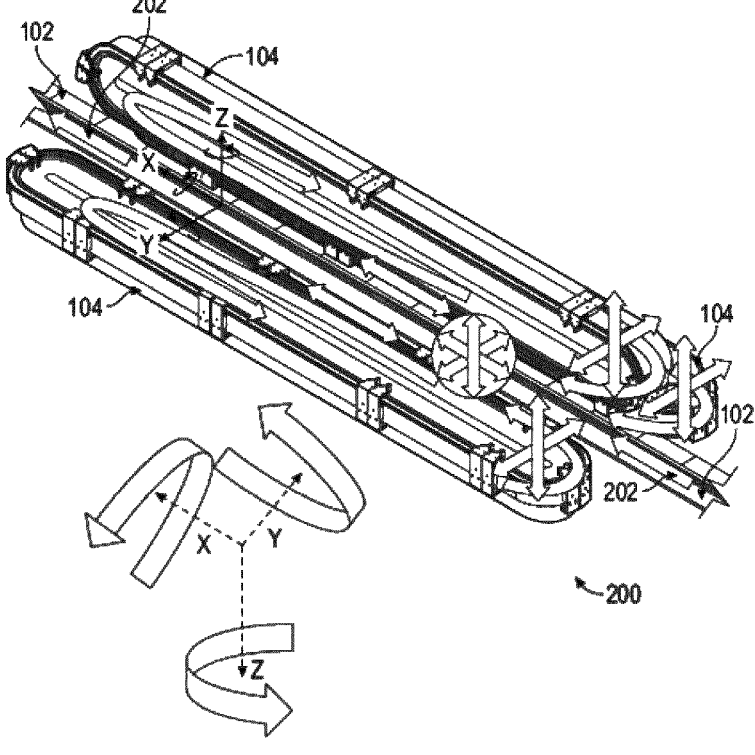
FIG. 2 illustrates a section of the system showing multiple adjacent transportation units positioned around one main transportation unit surrounding the main transportation unit from three dimensions, in accordance with an embodiment of the present invention.
Figure 3:
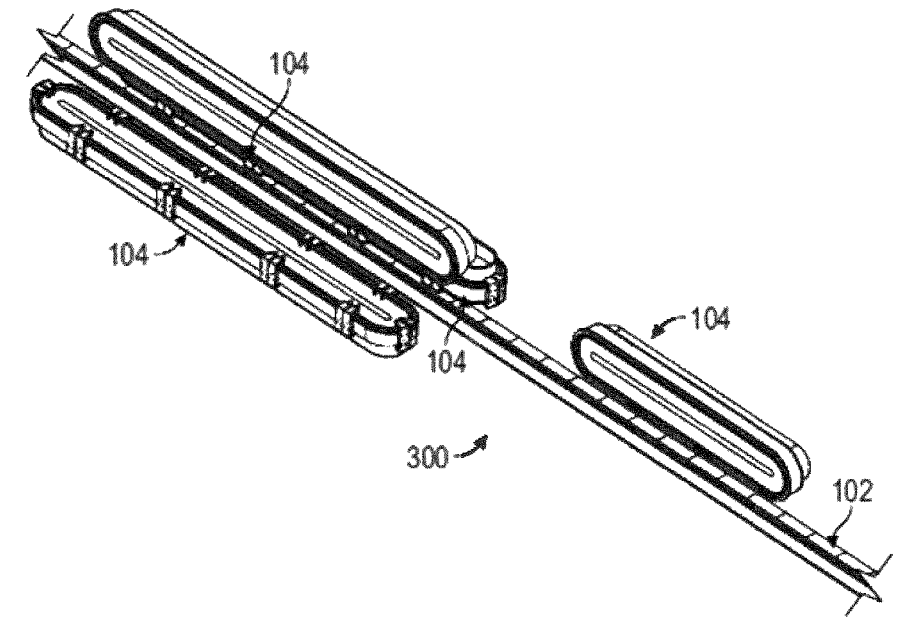
FIG. 3 illustrates a schematic floor plan of the system, in accordance with an embodiment of the present invention.

FIGS. 2 and 3 illustrates a section of a system showing multiple adjacent transportation units 104 positioned around one main transportation unit 102, in accordance with an embodiment of the present invention. The section 300 of the system 100 comprises three adjacent transportation units 104 situated around one main transportation unit 102, enveloping the main transportation unit 102 from three sides of the main transportation unit 102, such as top, left and right. The main transportation unit 102 may act as the master backbone of the system 100, and the individual primary containers 110 on the main transportation unit 102 move in the machine direction as shown by the arrow 202.

In an embodiment, each of the three adjacent transportation units 104 is able to move in three dimensions independently of each other. In other words, the three adjacent transportation units 104 are able to move in three dimensions or three axes, along and or about the X-, Y- and Z-axes with respect to the main transportation unit 102.

It may be apparent to a person ordinary skilled in the art that the system 100 may also include at least three adjacent transportation units 104 enveloping the main transportation unit 102 from at least three sides, inclined to the main transportation unit 102 at any suitable angle, situated at any suitable distance from main transportation unit 102 and moving independently in three dimensions with respect to the main transportation unit 102, thereby covering movement about the main transportation unit 102 in maximum degrees of freedom, giving the system 100 large flexibility in performing operations on the individual primary containers on the main transportation unit 102, without deviating from the meaning and scope of the present invention.

Thus, the system 100 is highly flexible and dynamic by including any suitable number of adjacent transportation units 104 around the main transportation unit 102, where the adjacent transportation units 104 are capable of having their independent movement in one or more dimensions with respect to the main transportation unit 102, and being able to be situated at any suitable distance in any direction and any suitable inclined or parallel or non-parallel (under rotation angle) position with respect to the main transportation unit 102. Therefore, the adjacent transportation units 104 are capable of providing packaging components and operations to the individual primary containers on the main transportation unit 102 in single and/or multiple degrees of freedom of movement.

Also, as mentioned above in FIG. 2, even the main transportation unit 102 is able to move with respect to the adjacent transportation unit 104, with the same flexibility and freedom as the adjacent transportation unit 104 has.

The system may be at least partially embedded in a supporting frame structure where the main transportation unit 102 and/or one or more of the adjacent transportation units 104 are supported on a frame structure.

Figure 4:
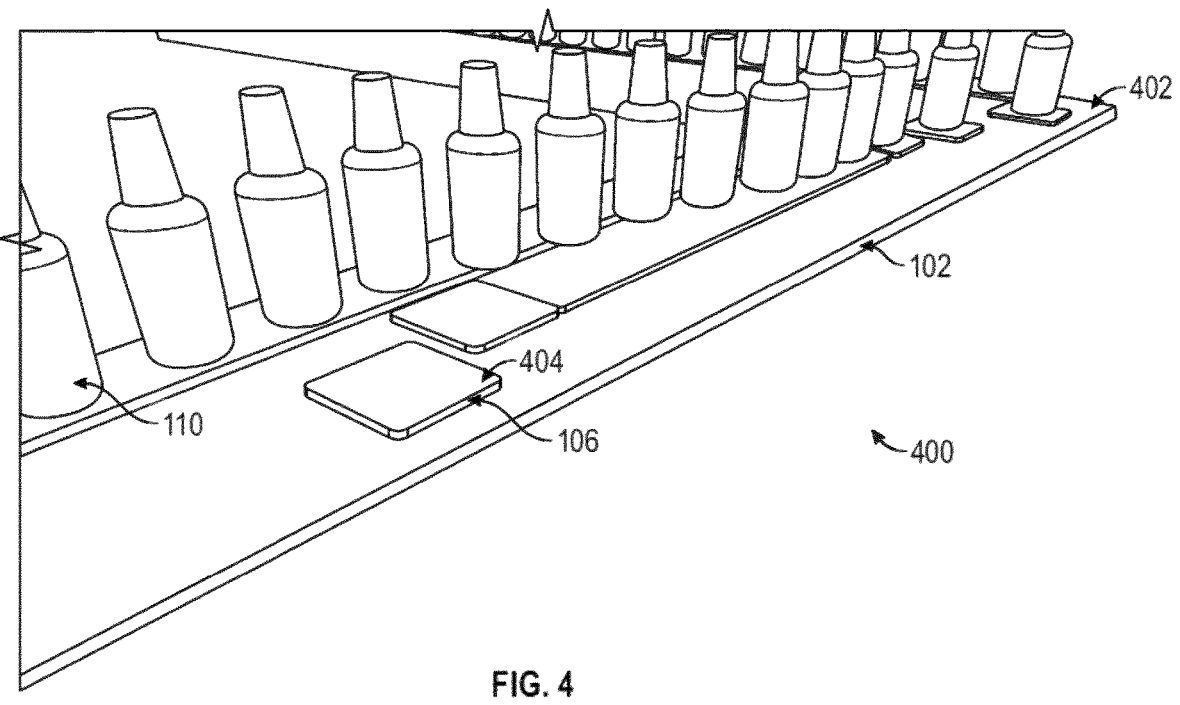
FIG. 4 illustrates an exemplary environment showing primary packaging containers, such as bottles, being transported on the main transportation unit, in flying motion, in accordance with an embodiment of the present invention.

FIG. 4 illustrates an exemplary environment showing primary packaging containers 110, such as bottles 110, being transported on the main transportation unit 102, via levitating tiles, in accordance with an embodiment of the present invention. The exemplary environment 400 shows the main transportation unit 102 as a magnetic driving surface 402, while the package movers 106 are the magnetic levitating tiles 404. The primary packaging containers 110 are being transported on the levitating tiles 404, under the levitating motion effect due to the electromagnetic forces created between the magnetic driving surface 402 and magnetic poles of the tiles 404.

In an embodiment, the container holding devices 108 are the magnetic levitating tiles 404 for holding, supporting and transporting the primary packaging containers 100.

In an embodiment, the package movers 106 are the magnetic levitating tiles 404 mounted with the container holding devices 108, where the container holding devices 108 are attached to the package movers 106, and hold and transport the primary packaging containers 110.

Figure 5:
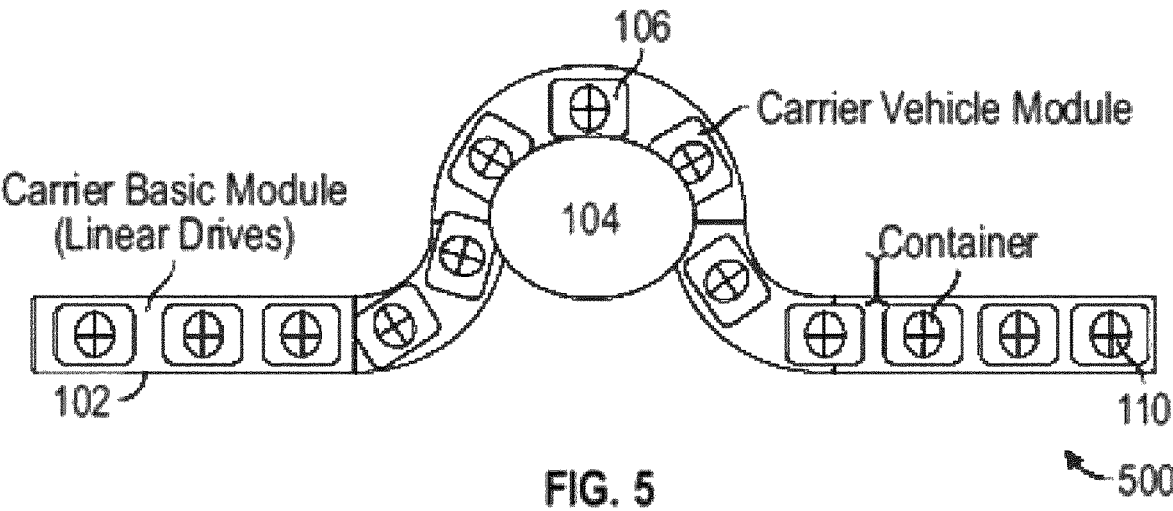
FIG. 5 illustrates an exemplary environment showing primary packaging containers being transported on the main transportation unit through the adjacent transportation, in accordance with an embodiment of the present invention.

FIG. 5 illustrates an exemplary environment showing primary packaging containers 110 being transported on the main transportation unit 102 through the adjacent transportation 104, in accordance with an embodiment of the present invention. The exemplary environment 500 shows the main transportation unit 102 transporting many packaging containers 110 to and through the adjacent transportation 104. The system 100 as described in the FIGS. 1-4, may include a single main transportation unit 102, that acts as the main backbone of the system 110, transporting the primary containers 110 through one or more packaging and/or treatment machines, where each may further include one or more adjacent transportation units 104. For example, a single main transportation unit 102 may transport the primary containers 110, such as bottles, to and through a cleaning machine, a filling machine, a capping machine and finally to a decorating machine, for performing cleaning, filling, capping, and decorating on the primary containers 110 which are transported on the single main transportation unit 102 throughout all the processes of cleaning, filling, capping, and decorating.

Figure 6:
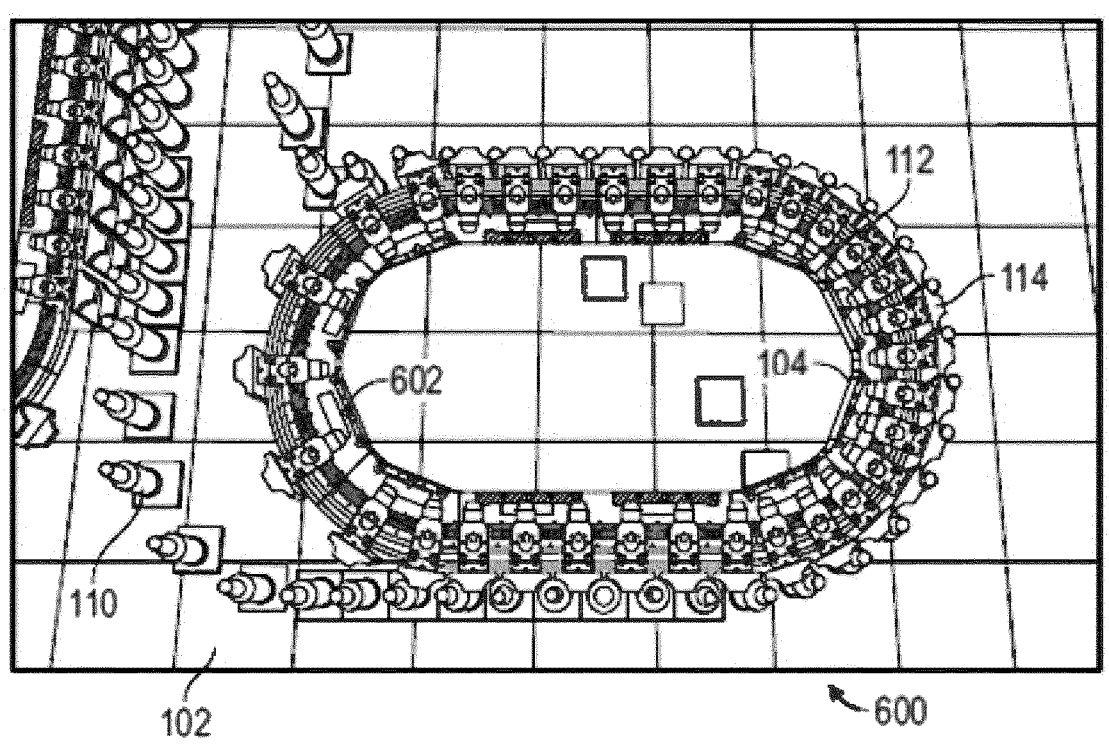
FIG. 6 illustrates an exemplary environment showing primary packaging containers, such as bottles, being transported on the main transportation unit through packaging/treatment machines that include the adjacent transportation, in accordance with an embodiment of the present invention.

FIG. 6 illustrates an exemplary environment showing primary packaging containers 110, such as bottles, being transported on the main transportation unit 102 through packaging/treatment machines that include the adjacent transportation 104, in accordance with an embodiment of the present invention. The exemplary environment 600 includes a packaging/treatment machine such as a capping machine 602 that performs a packaging operation of capping the bottles 110. The capping machine 602 may include one or more adjacent transportation units 104 and the necessary capping tools 114 for performing the capping operation are mounted on the tool movers 112 of the adjacent transportation unit 104. The main transportation unit 102 transports bottles 110 to and through the capper machine's 602 each and all adjacent transportation units 104. It is understood that alternatively or in addition to a capping machine the exemplary environment 600 may comprise a filling machine or a rinsing machine as well.

Figure 7:
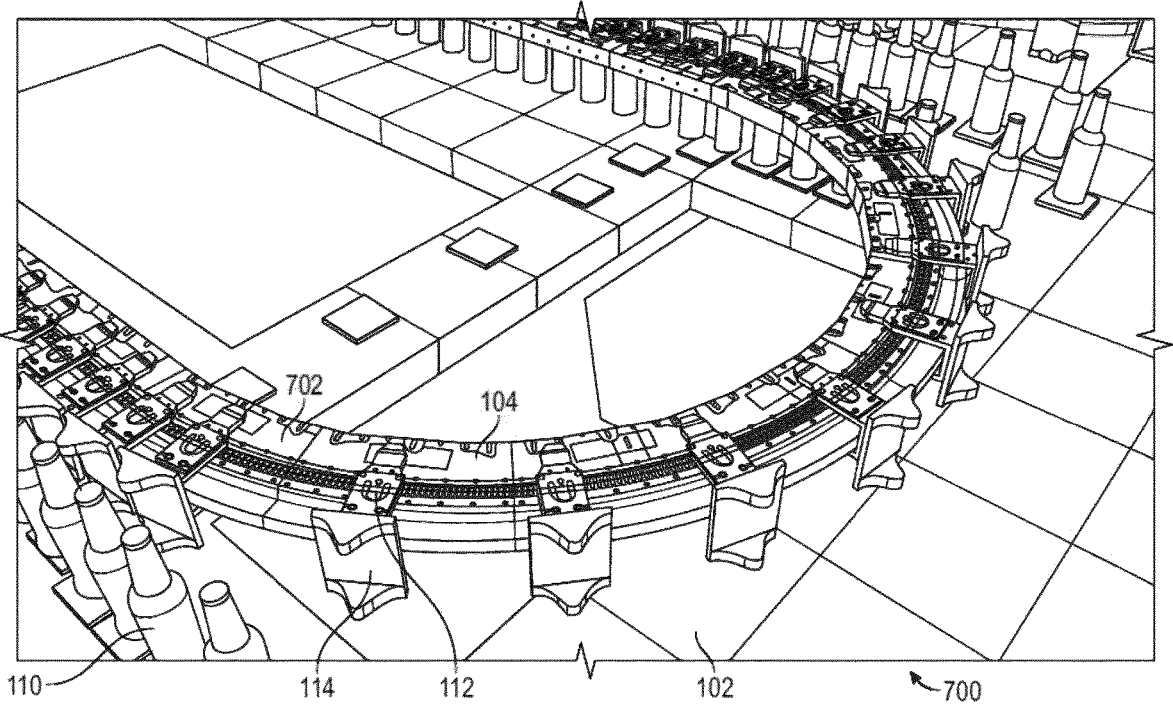
FIG. 7 illustrates an exemplary environment showing primary packaging containers, such as bottles, being transported on the main transportation unit through packaging/treatment machines that include the adjacent transportation, in accordance with an embodiment of the present invention

FIG. 7 illustrates an exemplary environment showing primary packaging containers 110, such as bottles, being transported on the main transportation unit 102 through packaging/treatment machines that include the adjacent transportation 104, in accordance with an embodiment of the present invention. The exemplary environment 700 includes a packaging/treatment machine such as a decorator 702 that performs a packaging/treatment operation of decorating the bottles 110. The decorator 702 may include one or more adjacent transportation units 104 and the necessary decorating tools 114 for performing the decorating operation are mounted on the tool movers 112 of the adjacent transportation unit 104. The main transportation unit 102 transports bottles 110 to and through the decorator's 702 each and all adjacent transportation units 104.

It may be understood by a person ordinary skilled in the art that the system 100 is not restricted to a capper 602 and a decorator 702, and may also include other packaging/treatment machines, such as a rinser, filler, labeling machine, and the like, without being restricted and deviating from the meaning and scope of the present invention.

Advantageously, the present invention provides a system and machine for performing one or more packaging, treatment or processing operations one the primary packaging containers, where the primary packaging containers are transported on the main transportation unit to and through one or more adjacent transportation units having one or more necessary tools to perform these operations. Both the main transportation unit and the adjacent transportation unit are moveable with respect to each other in one or more dimensions and degrees of freedom. Since the main transportation unit transports the primary containers through the adjacent transportation units, the system may avoid infeed/ outfeed movements of the main transportation unit and the adjacent transportation unit (e.g. as shown in FIGS. 6 and 7).

Further, the system enables the tools to perform the operations on individual primary container.

Furthermore, the main transportation unit may hold and transport the primary containers for inter-machine individual primary transfer (infeed/outfeed). Also, the main transportation unit may hold and transport the primary containers for through machine individual primary transfer (e.g. for processing operation). Additionally, the main transportation unit may transport the primary containers for performing the processing operations on them while the containers are in transit. (e.g. rotation).

The system also provides position settable drives for the main transportation unit and the adjacent transportation unit. Furthermore, the system provides performing operations on the containers from one or more directions, dimensions, such as using a mover mounted side tool for processing primary containers in transit.

Also, the container holding devices in the system for holding the containers may be automatically actuated which are highly adaptable for holding a variety of primary containers of varying shapes and sizes, with performing a number of handling operations such as tilting, rotating, spinning, etc., such as including a gripper with actuated claw(s) or fingers. The container holding devices may be inductively powered via the package movers.

The invention claimed is:

1. A system for treating primary containers, the system comprising:
   a main transportation unit configured to transport a number of container holding devices mounted on independently motion controlled movers, each container holding device adapted for transporting an individual primary container;
   a plurality of adjacent transportation units each configured to transport a number of tools mounted on independently motion controlled movers, said tools configured to provide one or more primary container material components to primary containers transported by the main transportation unit and/or perform packaging process operations on the primary containers transported by said main transportation unit, wherein said adjacent transportation units are moveable relative to said main transportation unit; and
   a control system enabling control of movement of the adjacent transportation units relative to the primary containers,
   wherein the control system further enables control of the movement of the adjacent transportation units so that the adjacent transportation units simultaneously provide one or more primary container material components to said primary containers in assembly and/or simultaneously perform packaging process operations on said primary containers in assembly.

2. The system according to claim 1, wherein said main transportation unit and/or at least one of said adjacent transportation units is a closed loop unit.

3. The system according to claim 1, wherein said adjacent transportation units are 3-dimensionally moveable relative to said main transportation unit.

4. The system according to claim 1, wherein the container holding devices and/or the tools are wirelessly controlled and/or wirelessly powered.

5. The system according to claim 1, comprising a control system enabling synchronization of a pace and pitch of the tools with a pace and pitch of the container holding devices of the main transportation unit.

6. The system according to claim 3, wherein the control system further enables control of 3-dimensional movement of the adjacent transportation units so that the adjacent transportation units simultaneously provide the one or more primary container material components to said primary containers in assembly and/or simultaneously perform the packaging process operations on said primary containers in assembly.

7. The system according to claim 1, wherein a mover of at least one of said adjacent transportation units supports only one tool, or supports several tools adapted differently for performing different operations dependent on the packaging process operations required, or wherein one tool may be is supported by several movers of at least one of said adjacent transportation units.

8. The system according to claim 1, wherein said number of tools are adapted for translating, positioning, off-setting, inclining, rotating, orienting, orientation sensing, labelling, coding, printing, inspecting, weighing, surface treating, heating, cooling, rinsing, cleaning, filling, capping, vibrating, illuminating, or measuring the primary containers in transit, or any combination thereof.

9. The system according to claim 1, wherein said container holding devices each comprises a container gripping unit.

10. The system according to claim 1, wherein the main transportation unit and/or at least one of the adjacent transportation units is a magnetic driving surface and its respective independently motion controlled movers are levitating tiles.

11. The system according to claim 1, wherein each of the container holding devices is adapted for moving a respective individual primary container relative to the tooling, including tools by inclining, tilting, or rotating the respective individual primary container along and/or around one or more of three orthogonal axes, and wherein the control system further enables synchronization of the tools with relative movement of the primary containers.

12. The system according to claim 1, further comprising a change-over station for loading and/or receiving and storing inactive tools and/or holding devices, and/or for adaptation or adjustment of tools and/or holding devices.

13. A machine for treating a primary container, the machine comprising a system according to claim 1.

14. The machine according to claim 13, wherein the main transportation unit is a continuous transportation unit.

* * * * *